(12) United States Patent
Okada

(10) Patent No.: US 6,173,620 B1
(45) Date of Patent: Jan. 16, 2001

(54) ANGLE POTENTIOMETER

(75) Inventor: Koichi Okada, Iwata-gun (JP)

(73) Assignee: NTN Corporation, Osaka (JP)

( * ) Notice: Under 35 U.S.C. 154(b), the term of this patent shall be extended for 0 days.

(21) Appl. No.: 09/452,457

(22) Filed: Dec. 2, 1999

(30) Foreign Application Priority Data

Dec. 17, 1998 (JP) .................................................. 10-358861
Dec. 17, 1998 (JP) .................................................. 10-358862

(51) Int. Cl.$^7$ ....................................................... G01D 7/02
(52) U.S. Cl. .......................... 73/866.1; 73/1.75; 324/723
(58) Field of Search ................................. 73/866.1, 1.75; 324/723; 338/68; 388/811

(56) References Cited

U.S. PATENT DOCUMENTS

| | | | | |
|---|---|---|---|---|
| 3,624,475 | * | 11/1971 | Smith | 388/811 |
| 4,994,752 | * | 2/1991 | Hata | 324/714 |
| 6,082,171 | * | 7/2000 | Wiggenhagen | 73/1.75 |

* cited by examiner

Primary Examiner—Richard A. Moller
(74) Attorney, Agent, or Firm—McDermott, Will & Emery

(57) ABSTRACT

A counter counts the repetitive pulse signals, a sawtooth generation circuit generates a sawtooth signal based on the count output of the counter, the amplitude and the offset of the sawtooth signal is adjusted by a resistance, and a comparing circuit compares the sawtooth signal with the analog voltage from an angle sensor to output a pulse signal having a duty ratio corresponding to the detected angle.

8 Claims, 3 Drawing Sheets

ANGLE POTENTIOMETER

BACKGROUND OF THE INVENTION

1. Field of the Invention

The present invention relates to an angle potentiometer. More specifically, the present invention relates to an angle potentiometer provided for an angle detection unit and the like for outputting the detected angle as the duty ratio of a pulse signal.

2. Description of the Background Art

Conventionally, an angle detection unit is utilized to detect the angle of a work arm of a construction machine or the like. Since the construction machine is used out of doors, there is the problem of severe environmental changes such as temperature differences and voltage fluctuations. Thus, in the angular detection unit, a stable A/D conversion is performed that is unaffected by the temperature changes and power-supply voltage fluctuations so as to output the angle detection signal as a digital signal.

The A/D conversion portion of a conventional angle detection unit compares the voltage of the output from an angle detection sensor with the voltage of a triangular wave generated in the analog circuit including a resistance and a capacitor, varies the threshold value shaping the triangular wave, and varies the duty ratio of the logic high or "H" level to the logic low or "L" level in the output pulse.

With this method, since an analog triangular wave is generated by a resistance and a capacitor, the amplitude and the frequency of the triangular wave are caused to change due to the variations in the resistance value of the resistance and in the capacitance value of the capacitor owing to temperature changes. Consequently, the frequency of the output pulse and the duty ratio are varied. Particularly, the variation of the duty ratio has particularly proven to be a problem.

In addition, when the angle detection unit is used in an adverse environment, i. e. where water or mud is splashed over the housing of the angle detection unit, the water or mud enters the housing, often causing the output terminal and the high voltage line to become short-circuited. In such cases, a high voltage is applied to the output transistor, which leads to a possible malfunction of the output transistor or the like. As a consequence, conventionally such measures are taken as utilizing a special seal to block the water or mud from entering into the electronic circuitry of the sensor even in such an adverse environment, employing an output semiconductor device having a good voltage withstanding characteristic, and connecting a high-speed fuse in series to the output. The special seal, however, has become expensive. Moreover, the signal characteristic of the output can be degraded, and sometimes the fuse does not respond in time. As a result, such disadvantages are noted as a higher cost of the sensor unit, the output specification that is less than satisfactory, and shortened lifetime of the electronic components of the internal circuit.

Thus, the main object of the present invention is to provide an angle potentiometer which decreases the variation of the duty ratio due to the variation of the power-supply voltage and which is capable of converting a stable analog signal into a duty ratio of a pulse signal.

Another object of the present invention is to provide an angle potentiometer that prevents the lifetime of the electronic components of the internal circuit from becoming short, by disconnecting the output at a high speed when an excessive voltage is added to the output signal.

SUMMARY OF THE INVENTION

Simply put, the present invention is an angle potentiometer having provided on a fixed member a sensor for detecting the rotation angle of a rotational body to output an analog signal, and for outputting the sensor output as a duty ratio of a pulse signal, including an oscillation circuit for outputting repetitive pulse signals, a counter for counting the pulse signals from the oscillation circuit, a triangular wave generation circuit for generating a triangular wave based on the count output of the counter, and a comparing circuit for comparing the generated triangular wave signal with the analog signal from the sensor and for outputting a pulse signal having a duty ratio corresponding to the angle.

Thus, according to the present invention, the triangular wave signal and the analog signal from the sensor are compared, and a pulse signal having a duty ratio corresponding to the sensor output is output so that the amplitude of the triangular wave and the voltage of the sensor output vary with the temperature changes, thereby eliminating the changes in the duty ratio due to the variation of the power-supply voltage.

A preferred embodiment of the present invention includes a circuit for adjusting the offset value and the amplitude value of the triangular wave signal generated from the triangular wave generation circuit.

In addition, a more preferred embodiment of the present invention includes an output protection circuit for disconnecting the output of the comparing circuit from the output terminal in order to protect the comparing circuit from being damaged when an excessive voltage is applied from outside.

The output protection circuit includes an output semiconductor device for providing the output of the comparing circuit to an output terminal, a voltage regulating diode that is rendered conductive when the voltage on the output side of the output semiconductor device exceeds a certain voltage level, and a controlling transistor for rendering the semiconductor device non-conductive upon conduction of the voltage regulating diode.

In a still another aspect of the present invention, an angle potentiometer for outputting the detected angle as a duty ratio of a pulse signal consists of a housing, a rotational axis that is rotationally supported in the housing, a resistor that is provided facing the end of the rotational axis and extending in the circumferential direction in the housing, a brush attached to the rotational axis for rotating with the rotation of the rotational axis while being in contact with the resistance to output a divided voltage, a pulse output circuit for outputting a pulse signal having a duty ratio determined by the voltage divided by the brush, and an output protection circuit for disconnecting the output of the pulse output circuit from the output terminal when an excessive voltage is applied.

Thus, according to the present invention, the internal circuit of the output protection circuit is protected against breakdown upon the application of the excessive voltage.

In a more preferred embodiment of the present invention, the output protection circuit consists of an output semiconductor device for providing the output of a pulse output circuit to an output terminal, a voltage regulating diode that is rendered conductive when the voltage on the output side of the output semiconductor device exceeds a certain voltage level, and a controlling transistor for rendering the semiconductor device non-conductive upon the conduction of the voltage regulating diode.

Moreover, in a more preferred embodiment of the present invention, the pulse output circuit consists of an oscillation circuit for outputting repetitive pulse signals, a counter for counting the pulse signals from the oscillation circuit, a triangular wave generation circuit for generating a triangular wave based on the count output of the counter, and a comparing circuit for comparing the generated triangular wave signal with the voltage divided by a brush and for outputting a pulse signal having a duty ratio corresponding to the angle.

Furthermore, a more preferred embodiment of the present invention includes a circuit for adjusting the offset value and the amplitude value of the triangular wave signal generated from the triangular wave generation circuit.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
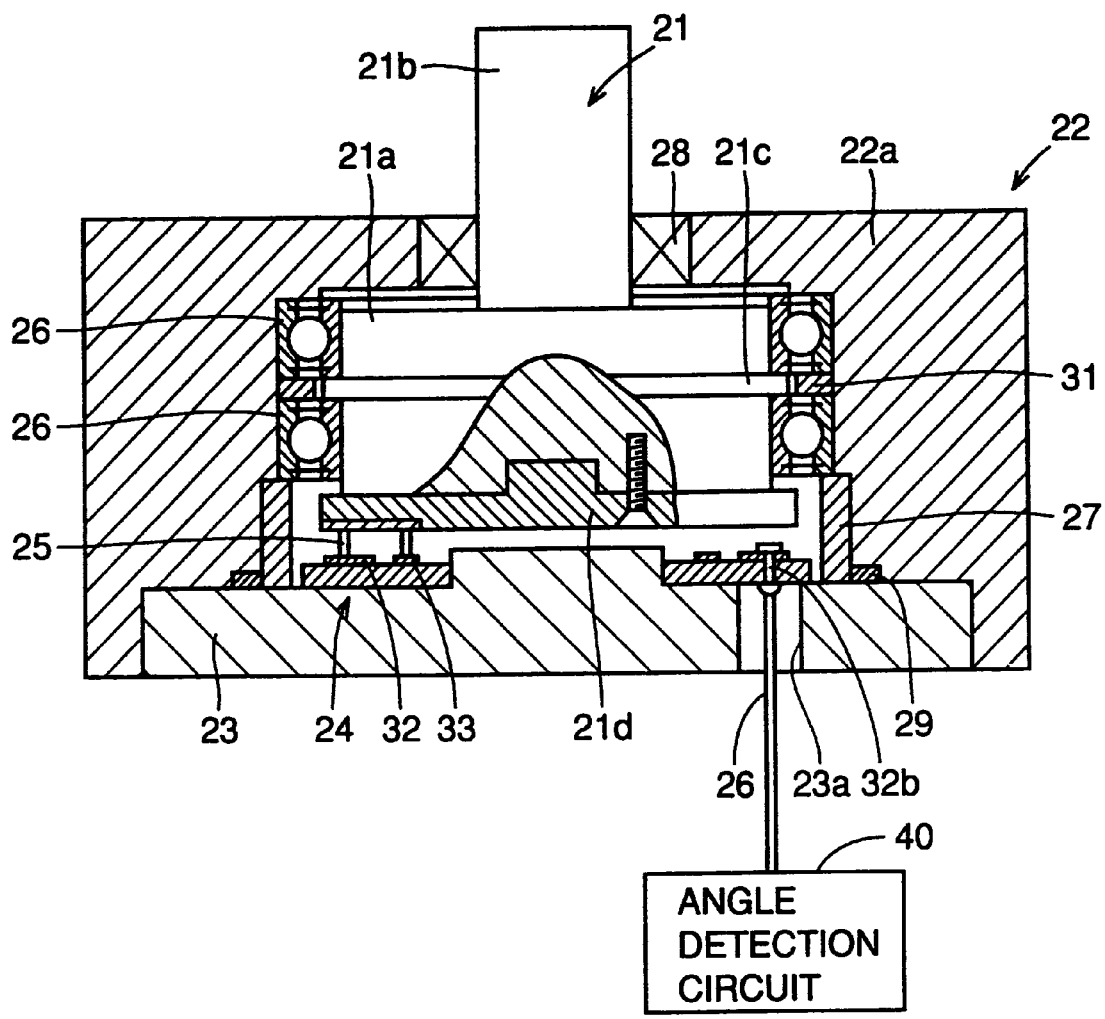
FIG. 1 is a cross section showing an example of an angle detection unit to which the present invention is applied.

FIG. 1 is a longitudinal cross section showing an angle detection unit to which the present invention is applied. In FIG. 1, a rotational axis 21 is formed by a stepped axis having a large diameter portion 21a and a small diameter portion 21b, and large diameter portion 21a is rotationally supported in a housing 22 by two rows of bearings 26, 26. An annular protrusion 21c is provided in the intermediate portion of large diameter portion 21a, and is held between the inner rings of the bearings 26, 26 with both bearings 26, 26 being preloaded.

Each bearing 26 is formed by a deep groove ball bearing with seals, for example. Bearings 26 are fixed to housing 22 by engaging the outer ring of the upper bearing 26 in FIG. 1 with one side of housing 22, and with a thin outer ring spacer 31 held between the two bearings 26, by pressing a housing cover 23 and a thick ring-like spacer 27 against the bearings.

A substrate 24 having a resistor 32 and an electric contact 33 on its upper surface is attached to the inner surface of housing cover 23, and a brush 25 that comes in contact with resistor 32 and electric contact 33 and renders them conductive is attached to the end of rotational axis 21. Brush 25 is provided on an end plate 21d bolted onto the end of rotational axis 21. Small diameter portion 21b of rotational axis 21 projects outward from a circular hole in housing 22, and an oil seal 28 is provided in the circular hole.

Terminals are respectively provided to both ends of resistor 32 and to a part of electric contact 33, and leads 26 connected to respective terminals are led out from a hole 23a in housing cover 23 and are connected to an angle detection circuit 40. Angle detection circuit 40 detects the voltage divided by brush 25 and outputs a pulse signal having a duty ratio corresponding to the angle.

With the angle detection unit shown in FIG. 1, since a plurality of preloaded bearings 26, 26 are used to support rotational axis 21 in housing 22, bearings 26 can support the load even when axial or radial force is applied to rotational axis 21 so that resistor 32 or the like is not subjected to any excessive load. In addition, since bearings 26 are preloaded, rotational axis 21 does not rattle, allowing a high-accuracy detection of the rotation angle even when some force is applied to rotational axis 21.

Figure 2:
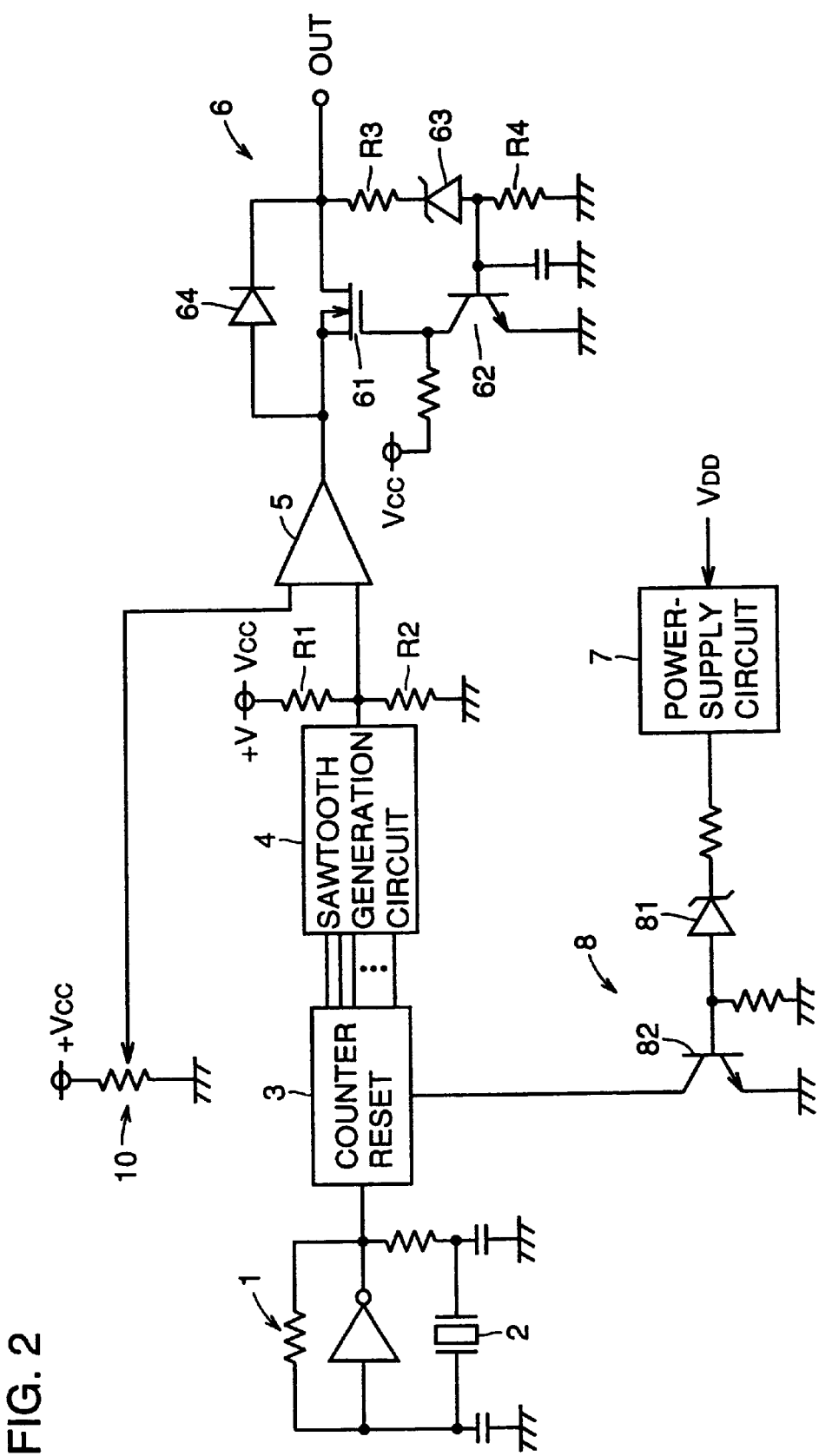
FIG. 2 is an electrical circuit diagram of an embodiment of the present invention.

FIG. 2 is an electrical circuit diagram of an embodiment of the present invention which corresponds to angle detection circuit 40 in FIG. 1. In FIG. 2, an oscillation circuit 1 is a self-oscillator that generates repetitive pulse signals based on the oscillation of a crystal oscillator 2, and the generated pulse signals are applied to a counter 3. Counter 3 counts the pulse signals and provides the count output to a sawtooth generation circuit 4 serving as a triangular wave generation circuit. Sawtooth generation circuit 4 generates a sawtooth signal based on the count output from counter 3 and provides the generated signal to a reference input terminal of comparing circuit 5. Moreover, a resistance R1 is connected between the reference input terminal of comparing circuit 5 and the power-supply line, and a resistance R2 is connected between the reference input terminal and the ground. These resistances R1 and R2 are provided to adjust the amplitude and the offset value of the sawtooth signal.

An angle sensor 10 (corresponding to resistor 32, electric contact 33, and brush 25 in FIG. 1) similar to the angle detection potentiometer as shown in the above FIG. 1 provides an analog voltage corresponding to the angle to a comparison input terminal of comparing circuit 5. Comparing circuit 5 compares the analog voltage with the sawtooth signal and outputs to an output protection circuit 6 a pulse signal having a duty ratio corresponding to the angle detected by angle sensor 10.

Output protection circuit 6 consists of an output transistor 61 formed by a MOSFET (Metal Oxide Semiconductor Field-Effect Transistor), a controlling transistor 62, a Zener diode 63, and resistances R3 and R4. The output of comparing circuit 5 is applied to the source of output transistor 61, and the drain of output transistor 61 is connected to an output terminal OUT. Resistance R3, Zener diode 63, and resistance R4 forming a series circuit are connected between the output terminal and the ground. The connection point of the anode of Zener diode 63 and resistance R4 is connected to the base of controlling transistor 62, and the collector of controlling transistor 62 is connected to the gate of output transistor 61.

A diode 64 is connected between the drain and the source of MOSFET 61. While MOSFET 61 acts to pull the current toward the output of comparing circuit 5, diode 64 acts to cause the current to flow from the output of comparing circuit 5 toward the output terminal.

Further, a Zener diode 81 and a transistor 82 are provided to reset counter 3 and to set the duty ratio of the signal output from output terminal OUT to either 0% or 100% when the voltage output from a power-supply circuit 7 becomes lower than a prescribed voltage. A d.c. voltage is applied from power-supply circuit 7 to the base of transistor 82 via Zener diode 81. Transistor 82 has its collector connected to the reset terminal of counter 3 and its emitter grounded.

Figure 3A:
FIGS. 3A–3E is a timing diagram relating to the description of the operation of the circuit of FIG. 2.
Figure 3B:
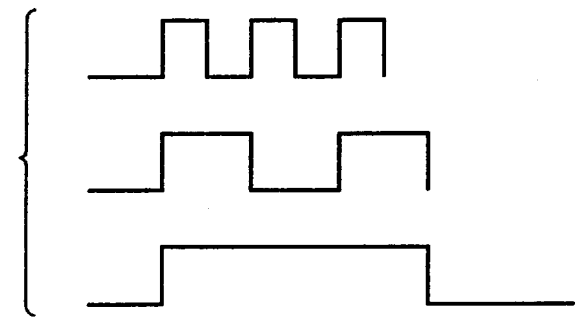
Figure 3C:
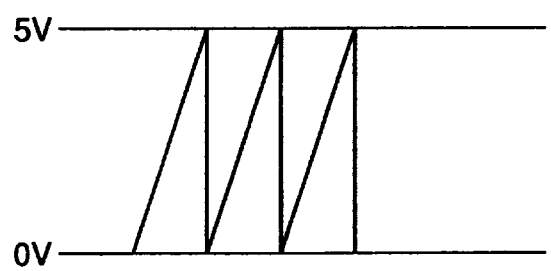
Figure 3D:
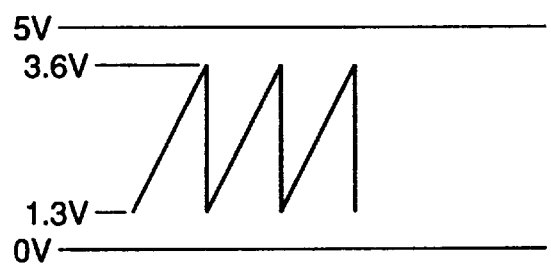
Figure 3E:

FIGS. 3A–3E is a timing diagram of the respective parts shown in FIG. 2. With reference to FIGS. 3A–3E, the specific operation of the circuit of FIG. 2 will be described below. Oscillation circuit 1 generates a repetitive pulse signal as shown in FIG. 3A based on the oscillation of crystal oscillator 2. At this time, a prescribed voltage is output from power-supply circuit 7, and Zener diode 81 as well as transistor 82 is rendered conductive. The reset input terminal of counter 3 is at the "L" level and has not been reset. Thus, counter 3 counts the repetitive pulses from oscillation circuit 1, and provides the count output as shown in FIG. 3B to sawtooth generation circuit 4. Sawtooth generation circuit 4 outputs a sawtooth signal as shown in FIG. 3C based on the count output from counter 3. Although the sawtooth signal oscillates between 0V and 5V as shown in FIG. 3C, it may be adjusted by resistances R1 and R2 to attain, for example, an amplitude of 3.6V and an offset value of 1.3 V as shown in FIG. 3D.

Comparing circuit 5 compares the sawtooth signal with the internal voltage from angle sensor 10 and outputs to output protection circuit 6 a pulse signal having a duty ratio corresponding to the angle detected by angle sensor 10. In output protection circuit 6, neither Zener diode 63 nor controlling transistor 62 conducts the current unless a high voltage is applied to output terminal OUT from outside. Thus, the gate of output transistor 61 is at the "H" level so that output transistor 61 conducts the current, and the output pulse signal from comparing circuit 5 is output to output terminal OUT.

If, for some reason, a relatively high power-supply voltage $V_{DD}$ applied to power-supply circuit 7 causes a short-circuit with output terminal OUT, however, the current flows via the path through resistance R3, Zener diode 63, and resistance R4, rendering Zener diode 63 conductive, and an "H" level signal is applied to the base of transistor 62 so that transistor 62 is also rendered conductive. Consequently, the gate of output transistor 61 attains the "L" level and output transistor 61 is switched off, causing the output of comparing circuit 5 and output terminal OUT to be cut off so that the electronic components such as comparing circuit 5 and output transistor 61 are protected from suffering a shortened lifetime.

When the short-circuit between output terminal OUT and a high voltage line is resolved, transistor 62 is again rendered non-conductive, and output transistor 61 is rendered conductive so that the output of the comparing circuit is provided to output terminal OUT. Thus the outputting condition returns to normal.

Moreover, when power-supply voltage +Vcc output from power-supply circuit 6 becomes lower than or equal to the Zener voltage of Zener diode 81, Zener diode 81 no longer conducts the current, and transistor 82 is rendered non-conductive so that the reset terminal of counter 3 attains the "H" level, which resets counter 3. As a result, the sawtooth voltage output from sawtooth generation circuit 4 is fixed to 0V, and the duty ratio of the output of comparing circuit 5 becomes either 0% or 100%.

In addition, although a sawtooth signal is applied to the reference input terminal of comparing circuit 5 in the above-described embodiment, the invention is not limited to the sawtooth signal, and a triangular wave which is more common may be used as well.

As described above, according to the present embodiment, the amplitude of the triangular wave and the voltage of the sensor output vary with the changes in temperature, and the changes in the duty ratio due to the variation of the power-supply voltage are eliminated by counting the repetitive pulse signals with a counter, generating a triangular wave based on the count output of the counter, and comparing the triangular wave signal with the analog signal output from the sensor to output a pulse signal having a duty ratio corresponding to the sensor output.

Furthermore, output transistor 61 and the internal circuit is protected against breakdown, since output transistor 61 is rendered non-conductive when output terminal OUT and a high voltage line become short-circuited.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An angle potentiometer having provided on a fixed member a sensor for detecting a rotation angle of a rotational body to output an analog signal, and for outputting a sensor output as a duty ratio of a pulse signal, comprising:
    an oscillation circuit for outputting repetitive pulse signals;
    a counter for counting the pulse signals from said oscillation circuit;
    a triangular wave generation circuit for generating a triangular wave based on a count output of the counter; and
    a comparing circuit for comparing the triangular wave signal generated from said triangular wave generation circuit with the analog signal output from said sensor and for outputting a pulse signal having a duty ratio corresponding to the angle.

2. An angle potentiometer according to claim 1, further comprising a circuit for adjusting an offset value and an amplitude value of the triangular wave signal generated from said triangular wave generation circuit.

3. An angle potentiometer according to claim 1, further comprising an output protection circuit for disconnecting an output of said comparing circuit from an output terminal when an excessive voltage is applied.

4. An angle potentiometer according to claim 3, wherein said output protection circuit includes
    an output semiconductor device for providing the output of said comparing circuit to said output terminal,
    a voltage regulating diode rendered conductive when voltage on an output side of said output semiconductor device exceeds a certain voltage level, and
    a controlling transistor for rendering said semiconductor device non-conductive upon conduction of said voltage regulating diode.

5. An angle potentiometer for outputting a detected angle as a duty ratio of a pulse signal, comprising:
    a housing;
    a rotational axis rotationally supported in said housing;
    a resistor provided facing an end of said rotational axis and extending in circumferential direction in said housing;
    a brush attached to said rotational axis for rotating with rotation of said rotational axis while being in contact with said resistor to output a divided voltage;
    a pulse output circuit for outputting a pulse signal having a duty ratio determined by the voltage divided by said brush; and
    an output protection circuit for disconnecting an output of said pulse output circuit from an output terminal when an excessive voltage is applied.

6. An angle potentiometer according to claim 5, wherein said output protection circuit includes
    an output semiconductor device for providing an output of a pulse output circuit to an output terminal,
    a voltage regulating diode rendered conductive when voltage on an output side of said output semiconductor device exceeds a certain voltage level, and a controlling transistor for rendering said semiconductor device non-conductive upon conduction of said voltage regulating diode.

7. An angle potentiometer according to claim 5, wherein said pulse output circuit includes an oscillation circuit for outputting a repetitive pulse signal, a counter for counting pulse signals from said oscillation circuit, a triangular wave generation circuit for generating a triangular wave based on a count output of said counter, and a comparing circuit for comparing the triangular wave signal generated from said triangular wave generation circuit with the voltage divided by said brush and for outputting a pulse signal having a duty ratio corresponding to an angle.

8. An angle potentiometer according to claim 7, further comprising a circuit for adjusting an offset value and an amplitude value of a triangular wave signal generated from said triangular wave generation circuit.

* * * * *